United States Patent Office 3,662,002
Patented May 9, 1972

3,662,002
CATALYTIC PRODUCTION OF DIMETHYL SULFIDE
Helmut Magerlein, Erlenbach, Gerhard Meyer, Obernburg, and Hans-Dieter Rupp, Erlenbach, Germany, assignors to Glanzstoff AG, Wuppertal, Germany
No Drawing. Filed Aug. 11, 1969, Ser. No. 849,203
Claims priority, application Germany, Aug. 10, 1968, P 17 93 174.7
Int. Cl. C07c *149/10*
U.S. Cl. 260—609 A           9 Claims

ABSTRACT OF THE DISCLOSURE

Process for the catalytic production of dimethyl sulfide in which methanol and hydrogen sulfide can be reacted in about equimolar amount to achieve almost quantitative yields of dimethyl sulfide by carrying out the reaction in the presence of a catalyst consisting essentially of aluminium oxide having a superimposed layer of up to about 10% by weight of silica applied thereto.

---

It is known that dimethyl sulfide can be produced by various processes, e.g., by the reaction of potassium sulfide with methyl chloride or by heating methyl isothiocyanate with sulfuric acid. The reaction of methyl iodide with sodium methylmercaptide also leads to dimethyl sulfide. This thioether is also formed in more or less large amounts as a by-product in the conversion of methanol with hydrogen sulfide into methyl mercaptan. Furthermore, it is possible to control the reaction of methanol with hydrogen sulfide in such a manner that dimethyl sulfide is obtained as the main product (see German Pat. No. 962,789). However, in this case a considerable amount of methyl mercaptan is also obtained as a by-product and must be separated in a cumbersome and difficult process.

The reaction of dimethyl ether with hydrogen sulfide in the presence of certain catalysts for the production of dimethyl sulfide has also been described in the prior art. Thus, German Pat. No. 1,016,261 recommends the use of sulfides of metals of Group VI of the Periodic System as catalysts for this reaction, although this particular process provides a yield of the dimethyl sulfide of only about 84%. An increase in this yield is possible only by recycling the off-gas and using an excess of the dimethyl ether.

In Canadian Pat. No. 553,412, a process for the production of dimethyl sulfide is described in which dimethyl ether and hydrogen sulfide are reacted in the presence of aluminum or thorium oxides or mixtures thereof as the essential catalyst. These catalysts contain polyvalent metals which have a greater affinity for oxygen than for sulfur. If desired, there can be intermixed with these catalysts various inert substances such as silicon dioxide. It is indicated that it is advantageous to employ a catalyst produced by calcining and milling bauxite and then treating with a solution of caustic soda in such a manner as to convert the bauxite into sodium aluminate. From this, the aluminum oxide is finally again precipitated. Moreover, one catalyst is mentioned which consists of an activated technical aluminum oxide gel admixed with about 5% silicic acid.

The reaction of dimethyl ether with hydrogen sulfide proceeds according to the known processes at temperatures between 320° C. and 450° C.

In order to achieve good yields with reference to the added hydrogen sulfide, the dimethyl ether must be employed in excess amounts which must again be separated from the final product. To also achieve as quantitative a reaction as possible with respect to the dimethyl ether, it becomes necessary to separate the non-reacted initial materials from the gases leaving the reaction zone and to lead these recovered materials back into the reaction zone. This, of course, represents a very troublesome procedure.

In following the known process, e.g., according to the above-noted Canadian patent, it has been established that the yields drop off very sharply with the use of temperatures below 350° C. However, for the conversion of dimethyl ether with hydrogen sulfide into dimethyl sulfide, it is desirable to carry out the reaction at the lowest possible temperatures since the formation of decomposition products increases with raised temperatures, e.g., as with a cracking gas. Methanol likewise tends to decompose at excessively high temperatures. It will be quite apparent that not only will the yields be reduced by higher temperatures, but also the substances formed as by-products by the thermal decomposition must be separated in additional or separate process steps. Moreover, the thermal decomposition causes the formation of elementary carbon which deposits on the catalyst in the form of coke and thus substantially reduces the activity and life of the catalyst.

One object of the present invention is to provide a catalytic process for the production of dimethyl sulfide from methanol and hydrogen sulfide which will give almost quantitative yields with reference to both of the initial reactants at temperatures below about 380° C. Another object of the invention is to avoid the formation of by-products, including coke deposits. These and other objects and advantages of the invention will become more apparent upon consideration of the following detailed specification.

It has now been surprisingly found in accordance with the invention that excellent yields of dimethyl sulfide can be achieved by reacting methanol with hydrogen sulfide, preferably in a molar ratio or stoichiometric equivalent ratio of approximately 2:1, in contact with a catalyst consisting essentially of aluminum oxide activated by a layer of about 0.2 to 10% by weight, preferably about 0.2 to 3% by weight, of silica superimposed thereon. The reaction proceeds best at a temperature of about 330° C. to 380° C.

The preparation of the catalyst to be used in the process of the invention can be accomplished in a number of ways. In all cases, however, it is essential to activate the aluminum oxide by depositing or superimposing silica on the surface thereof, preferably by depositing silicic acid by using silicon tetrachloride and water or sodium silicate and hydrochloric acid onto the aluminum oxide and washing neutral as well as drying to achieve a neutral-reacting, silica-coated aluminum oxide catalyst.

The following method of preparing the catalyst is especially suitable. A pure aluminum oxide is first treated with an aqueous sodium silicate solution (waterglass). It is then evaporated to dryness. Next the coated aluminum oxide is treated with hydrochloric acid and washed neutral with distilled water. Finally, the neutral catalyst is dried and can be used directly in the reaction according to the invention.

One can also treat a moist, pure aluminum oxide with silicon tetrachloride which has been diluted with hexane and then wash the treated material neutral with water. The silicon tetrachloride reacts with the water of the moistened or wetted aluminum oxide so as to deposit silicic acid onto the oxide. After washing with distilled water until there is a neutral reaction of the wash water, the resulting product is dried and ready for use.

The aluminum oxide used for the catalyst must be pure and should not contain any alkaline residues. The particle size of the aluminum oxide can vary within wide limits, for example from about 0.1–10 mm.

It has proven to be especially advantageous for purposes of the invention to use an aluminum oxide which has been activated with a superimposed layer of 0.2 to 3% by weight of silica. Nevertheless, it will be understood that even larger amounts of silica can be used with reference to the aluminum oxide substrate or catalytic carrier. For example, catalysts with a superimposed layer of 10% by weight of silica have also proven to be useful. Thus, while it is believed that the aluminum oxide becomes activated by the silicic acid or silica deposited thereon, the reverse may also be true, i.e., that the silica becomes combined in some manner with the aluminum oxide to form active sites on the catalyst surface.

It is quite important to wash the catalyst until neutral after depositing the silicic acid as $SiO_2$ onto the aluminum oxide so that there is no residue of acid such as hydrochloric acid. Likewise, alkaline residues must be avoided in the finished catalyst as well as in the initial aluminum oxide. Good results cannot be assured except with a substantially neutral-reacting catalyst.

After the prepared catalyst has been dried, it can first be subjected to a heat treatment a temperatures of about 300–400° C. prior to the reaction of the methanol with hydrogen sulfide. This preheating step appears to improve the mechanical stability and coherence of the catalyst, i.e., so that the silica layer remains firmly attached to the aluminum oxide.

For carrying out the process according to the invention, the catalyst is introduced into a suitable reactor, e.g., a vertically arranged reaction tube adapted to receive a catalyst bed. The reaction zone can be heated by any suitable means, e.g., a heating jacket or the like, to a temperature which may be in the broad range of about 320° C. to 450° C., but is preferably adjusted between about 330° C. and 380° C. Before their entry into the reaction zone, the gaseous reactants are preferably preheated to about 280° C. to 330° C. The hydrogen sulfide and methanol are most advantageously introduced in stiochiometric equivalent amounts into the reaction zone for passage in contact with the catalyst. Although the catalyst loading, i.e., the throughput amount of methanol per ml. of catalyst per hour, can be varied over a relatively wide range, it has proven to be especially advantageous to carry out the reaction with a throughput of about 0.25 to 0.5 gram of methanol per ml. of catalyst per hour and in one preferred embodiment at a throughput of methanol of about 0.2 to 0.3 gram per milliliter of catalyst per hour with a low temperature range of 310° C. to 350° C.

A practically quantitative conversion is achieved with the process according to the invention without it being necessary to recycle gases back into the reaction zone. The selectivity is outstanding; thus, by using a catalyst of aluminum oxide with a superimposed layer of 2% by weight $SiO_2$ and a throughput of 0.304 gram of methanol per ml. of catalyst per hour (and an equivalent throughput of hydrogen sulfide), there is obtained a yield of 96.9% of dimethyl sulfide.

The proportion of by-products is extremely small and amounts to not more than about 3%. The recovery of the reaction product can be accomplished very easily. Since the temperature of the reaction is relatively low, i.e., capable of being maintained between about 330° C. and 380° C., a thermal decomposition can be substantially avoided, i.e., so that very little or practically no by-products are formed according to the equation:

$$2CH_3OH \rightarrow CH_4 + CO + H_2 + H_2O$$

Also, a deposition of carbon which reduces the activity of the catalyst is practically completely prevented. A long catalyst life can thus be achieved so as to maintain high yields over an extended period of time.

The invention is further illustrated by the following examples.

EXAMPLE 1

Into the midle of a 560 mm. long glass tube having an inner diameter of 35 mm. there is introduced 30 ml. of a catalyst which consists of a neutral aluminum oxide with a superimposed layer of 2% by weight of $SiO_2$. While maintaining a temperature of 360° C. in the reaction zone, a mixture of 9.12 grams of methanol and 4.86 grams of hydrogen sulfide per hour are conducted over the catalyst. The conversion amounts to 100% of which the reaction products are 96.9% dimethyl sulfide, 2.8% methyl mercaptan and 0.3 dimethyl ether.

EXAMPLE 2

Using the same reaction conditions as in Example 1, the catalyst consisted of aluminum oxide bearing a superimposed layer of 5% by weight $SiO_2$. The conversion amounted to 98%. The proportions of this almost total conversion were as follows: dimethyl sulfide=98%; methyl mercaptan=1.4%; and dimethyl ether=0.06%.

If one proceeds under the same reaction conditions as in the preceding examples but using only the aluminum oxide without the $SiO_2$ layer, then the conversion amounts to 96.8% with the reaction products consisting of 27.1% dimethyl sulfide, 10.4% methyl mercaptan and 67.8% dimethyl ether.

On the other hand, if the same reactions are used but with an homogeneous mixture of aluminum oxide containing 2% by weight $SiO_2$ distributed therein, then the conversion amounts to 96.2%. The conversion products are distributed as follows: dimethyl sulfide=47.7%; methyl ether mercaptan=35.3%; and dimethyl ester=17.0%.

The invention is hereby claimed as follows:

1. In a process for the production of dimethyl sulfide by catalytically reacting methanol with hydrogen sulfide at an elevated temperature, the improvement which comprises carrying out said reaction at about 310° C. to 450° C. in contact with a neutral-reacting catalyst consisting essentially of aluminum oxide activated by a layer of about 0.2 to 10% by weight of silica superimposed thereon.

2. A process as claimed in claim 1 wherein the amount of silica superimposed onto said aluminum oxide is about 0.2 to 3% by weight.

3. A process as claimed in claim 1 wherein the methanol and the hydrogen sulfide are reacted in a molar ratio of approximately 2:1.

4. A process as claimed in claim 1 wherein said reaction is carried out at a temperature of about 330° C. to 380° C.

5. A process as claimed in claim 1 wherein about 0.25 to 0.5 gram of methanol are reacted per hour and per milliliter of catalyst with an approximately stoichiometric equivalent amount of hydrogen sulfide at a temperature of about 330° C. to 380° C.

6. A process as claimed in claim 5 wherein the amount of silica superimposed onto said aluminum oxide is about 0.2 to 3% by weight.

7. A process as claimed in claim 1 wherein said catalyst is a substantially neutral reacting, silica-coated aluminum oxide obtained by depositing silicic acid using silicon tetrachloride and water or sodium silicate and hydrochloric acid onto the surface of the aluminum oxide, washing neutral with water and then drying and neutralizing the coated aluminum oxide.

8. A process as claimed in claim 7 wherein the catalyst has been preheated at temperatures of between about 300° C. and 400° C. prior to being used in said reaction of methanol with hydrogen sulfide.

9. A process as claimed in claim 1 wherein said aluminum oxide contains about 0.2 to 3% by weight of silica deposited thereon, and the two reactants are conducted in a molar ratio of about 2:1 over said catalyst at a temperature of about 310° C. to 350° C. and a throughout of methanol of about 0.2 to 0.3 gram per milliliter of catalyst per hour.

References Cited

UNITED STATES PATENTS

| 2,816,146 | 12/1957 | Doumani | 260—609 A |
|---|---|---|---|
| 2,951,872 | 9/1960 | Folkins et al. | 260—609 A |

JOSEPH REBOLD, Primary Examiner

D. R. PHILLIPS, Assistant Examiner

U.S. Cl. X.R.

252—455 R; 260—614 R

PO-1050
(5/69)

UNITED STATES PATENT OFFICE
CERTIFICATE OF CORRECTION

Patent No. 3,662,002          Dated May 9, 1972

Inventor(s) Helmut Magerlein et al

It is certified that error appears in the above-identified patent and that said Letters Patent are hereby corrected as shown below:

Column 1, line 18, "amount" should read -- amounts --.

Column 4, line 31, "0.06%" should read -- 0.6% --; line 43, "ether mercaptan" should read -- mercaptan --.

Column 5, line 9, claim 9, "throughout" should read -- throughput --.

Signed and sealed this 5th day of September 1972.

(SEAL)
Attest:

EDWARD M. FLETCHER, JR.
Attesting Officer

ROBERT GOTTSCHALK
Commissioner of Patents